(12) United States Patent
Beckmann et al.

(10) Patent No.: US 12,132,968 B2
(45) Date of Patent: Oct. 29, 2024

(54) DOWNLOADABLE AUDIO FEATURES

(71) Applicant: DSP Concepts, Inc., Santa Clara, CA (US)

(72) Inventors: Paul Eric Beckmann, Sunnyvale, CA (US); Jeffrey M. Brockmole, Brighton, MI (US); Arpit Shah, Austin, TX (US)

(73) Assignee: DSP Concepts, Inc., Santa Clara, CA (US)

( * ) Notice: Subject to any disclaimer, the term of this patent is extended or adjusted under 35 U.S.C. 154(b) by 223 days.

(21) Appl. No.: 17/551,824

(22) Filed: Dec. 15, 2021

(65) Prior Publication Data

US 2023/0188805 A1    Jun. 15, 2023

(51) Int. Cl.
*H04N 21/81*      (2011.01)
*G11B 27/031*     (2006.01)

(52) U.S. Cl.
CPC ....... *H04N 21/8106* (2013.01); *G11B 27/031* (2013.01)

(58) Field of Classification Search
None
See application file for complete search history.

(56) References Cited

U.S. PATENT DOCUMENTS

| | | |
|---|---|---|
| 2011/0257974 A1 | 10/2011 | Kristjansson et al. |
| 2011/0300806 A1 | 12/2011 | Lindahl et al. |
| 2012/0078402 A1 | 3/2012 | Crockett et al. |
| 2014/0314245 A1 | 10/2014 | Asada et al. |
| 2018/0146310 A1* | 5/2018 | Bazzoni ............... G16H 40/67 |
| 2021/0266655 A1* | 8/2021 | Patel .................. H04R 1/1041 |

FOREIGN PATENT DOCUMENTS

| | | |
|---|---|---|
| EP | 2618329 | 7/2013 |
| EP | 3573079 | 11/2019 |

OTHER PUBLICATIONS

Spittle, Gary, et al., "Developing plugins for your ears", AES 151st Convention, Oct. 2021, Online, 5 pgs.
"International Application Serial No. PCT US2022 052271, International Search Report mailed Mar. 28, 2023", 4 pgs.
"International Application Serial No. PCT US2022 052271, Written Opinion mailed Mar. 28, 2023", 8 pgs.

\* cited by examiner

*Primary Examiner* — Omar S Parra
(74) *Attorney, Agent, or Firm* — Schwegman Lundberg & Woessner, P.A.

(57) ABSTRACT

A method of providing custom audio processing in an audio device having an embedded audio DSP framework is disclosed. The audio device has an associated application that runs on a personal computing device. The method comprises receiving a notification of the availability of an audio processing configuration file, the audio processing configuration file identifying audio modules, interconnections between the audio modules and related settings for custom audio processing, transmitting a request for the audio processing configuration file from the personal computing device, receiving the audio processing configuration file at the personal computing device, transmitting the audio processing configuration file to the audio device from the personal computing device, and loading the audio processing configuration file into the audio device.

20 Claims, 6 Drawing Sheets

DOWNLOADABLE AUDIO FEATURES

BACKGROUND

Current audio devices, such as headphones, earbuds, smart speakers, televisions and so forth, have become more sophisticated and connected. Consumers have also become more demanding. Current solutions for managing audio playback typically include the ability to adjust the volume and check the battery level of an audio rendering device using an app on an associated smartphone. In some instances, other settings or functions may be performed by an associated app, such as activating noise canceling or updating firmware.

BRIEF DESCRIPTION OF THE SEVERAL VIEWS OF THE DRAWINGS

Some example embodiments of the present disclosure are illustrated by way of example and not limitation in the figures of the accompanying drawings, in which like reference numbers indicate similar elements. To easily identify the discussion of any particular element or act, the most significant digit or digits in a reference number refer to the figure number in which that element is first introduced.

DETAILED DESCRIPTION

Figure 1:
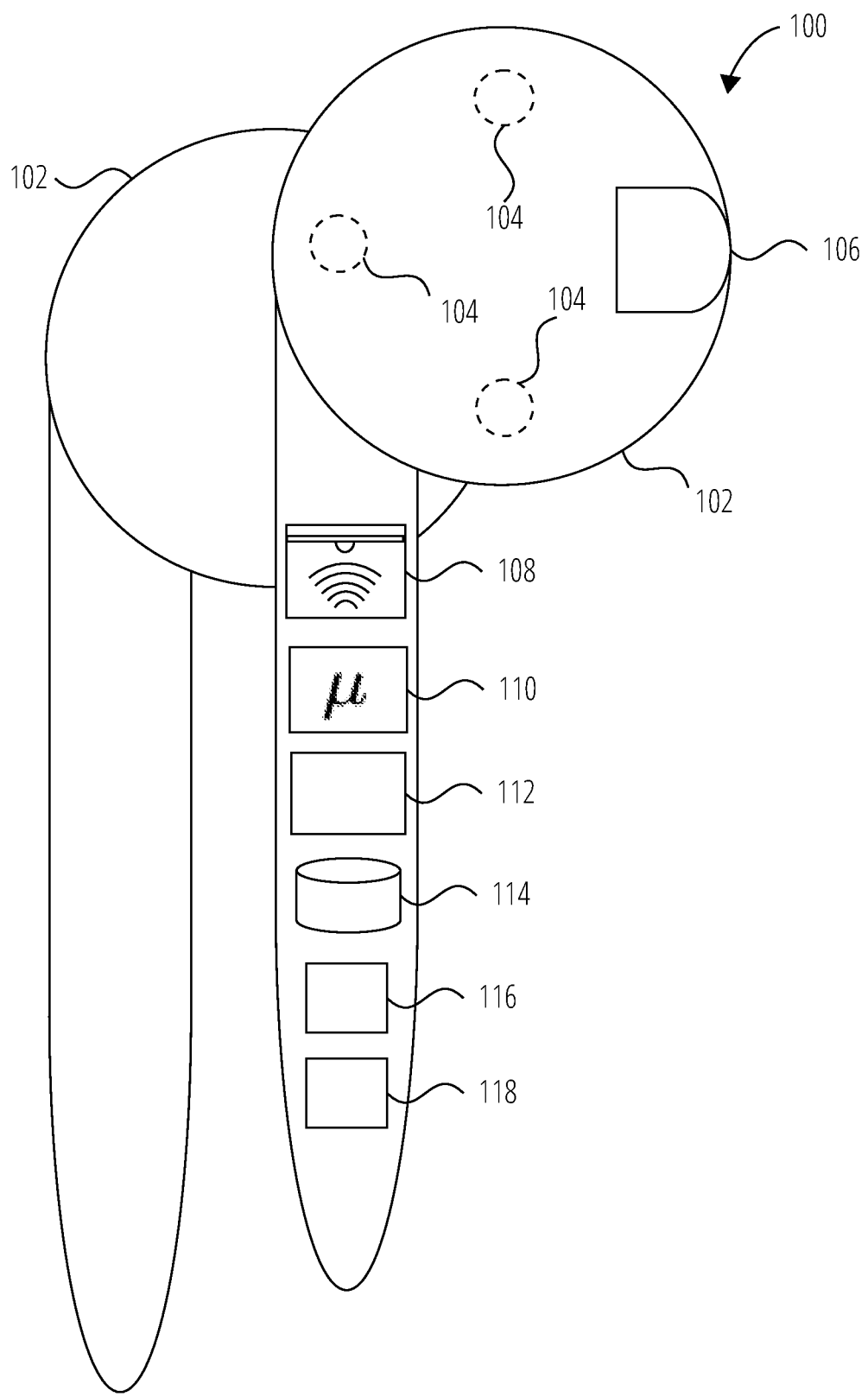
FIG. 1 illustrates example wireless ear buds that together form a set of wearable audio devices according to some examples.

In some examples, provided is a method of providing custom audio processing in an audio device. The method includes receiving, at an application associated with the audio device that runs on a personal computing device, a notification of the availability of an audio processing configuration file. The audio processing configuration file identifying audio modules, interconnections between the audio modules and related settings for custom audio processing. The method further comprises transmitting a request for the audio processing configuration file from the personal computing device, receiving the audio processing configuration file at the personal computing device, transmitting the audio processing configuration file to the audio device from the personal computing device, and loading the audio processing configuration file into the audio device.

The audio device may include an audio DSP processing framework including a run-time execution engine and run-time libraries, and the audio processing configuration file may be a binary file that configures specific run-time libraries to provide customized audio processing. The audio processing configuration file may have been created by an independent third-party developer and not a manufacturer of the device.

The method may further include providing a user notification of the availability of an audio processing configuration file, and receiving user input via the application on the personal computing device to load the audio processing configuration file into the audio device. Additionally, the method may include accessing an auto-update setting for the application or the personal computing device, and transmitting the request for the audio processing configuration file from the personal computing device without user input, based on the auto-update setting being positive. The audio processing configuration is loaded into the audio device without requiring updating or recompiling of executable code.

In some examples, provided is a non-transitory computer-readable storage medium, the computer-readable storage medium including instructions that when executed by a computer, cause the computer to perform operations for providing custom audio processing in an audio device according to the methods described above, the operations including but not being limited to receiving, at an application associated with the audio device that runs on a personal computing device, a notification of the availability of an audio processing configuration file, the audio processing configuration file identifying audio modules, interconnections between the audio modules and related settings for custom audio processing, transmitting a request for the audio processing configuration file from the personal computing device, receiving the audio processing configuration file at the personal computing device, transmitting the audio processing configuration file to the audio device from the personal computing device, and loading the audio processing configuration file into the audio device.

In some examples, provided is computing apparatus comprising a processor and a memory storing instructions that, when executed by the processor, configure the apparatus to perform operations for providing custom audio processing in an audio device according to the methods described above, the operations the operations including but not being limited to receiving, at an application associated with the audio device that runs on a personal computing device, a notification of the availability of an audio processing configuration file, the audio processing configuration file identifying audio modules, interconnections between the audio modules and related settings for custom audio processing, transmitting a request for the audio processing configuration file from the personal computing device, receiving the audio processing configuration file at the personal computing device, transmitting the audio processing configuration file to the audio device from the personal computing device, and loading the audio processing configuration file into the audio device.

Other technical features may be readily apparent to one skilled in the art from the following figures, descriptions, and claims.

FIG. 1 illustrates example wireless ear buds 100 that together form a set of wearable audio devices. Each wireless ear bud 102 includes a communication interface 108 used to communicatively couple with an audio source or sink device, e.g., a client device 206 (see FIG. 2) that can provide audio data that the wireless ear buds 100 can reproduce as audio signals for a user of the wireless ear buds 100, or that can receive audio data from the wireless ear buds 100. Each wireless ear bud 102 also includes a battery 116 and optionally one or more sensors 104 for detecting a wearing status of the wireless ear buds 100, e.g., when a wireless ear bud 102 is placed in or on and/or removed from an ear.

Additionally, each wireless ear bud 102 includes an audio transducer 106 for converting a received signal including audio data, into audible sound and one or more microphones 118 for generating ambient and speech signals. A receive audio signal can be received from a paired companion communication device such as client device 206 via the communication interface 108, or alternatively the receive signal may be relayed from one wireless ear bud 102 to the other. A transmit audio signal can be generated from the one or more microphones 118 in the wireless ear buds 100.

One or both of the wireless ear buds 102 include a DSP framework 112 for processing received audio signals and/or signals from the one or more microphones 118, to provide to the audio transducer 106 or a remote user. The DSP framework 112 is a software stack running on a physical DSP core (not shown) or other appropriate computing hardware, such as a networked processing unit, accelerated processing unit, a microcontroller, graphics processing unit or other hardware acceleration. The DSP core will have additional software such as an operating system, drivers, services, and so forth. One or both of the wireless ear bud 102 also include a processor 110 and memory 114. The memory 114 in the wireless ear buds 100 stores firmware for operating the wireless ear buds 100 and for pairing the wireless ear buds 100 with companion communication devices.

Although described herein with reference to wireless ear buds, it will be appreciated that the methods and structures described herein are applicable to any audio device that may benefit therefrom.

Figure 2:
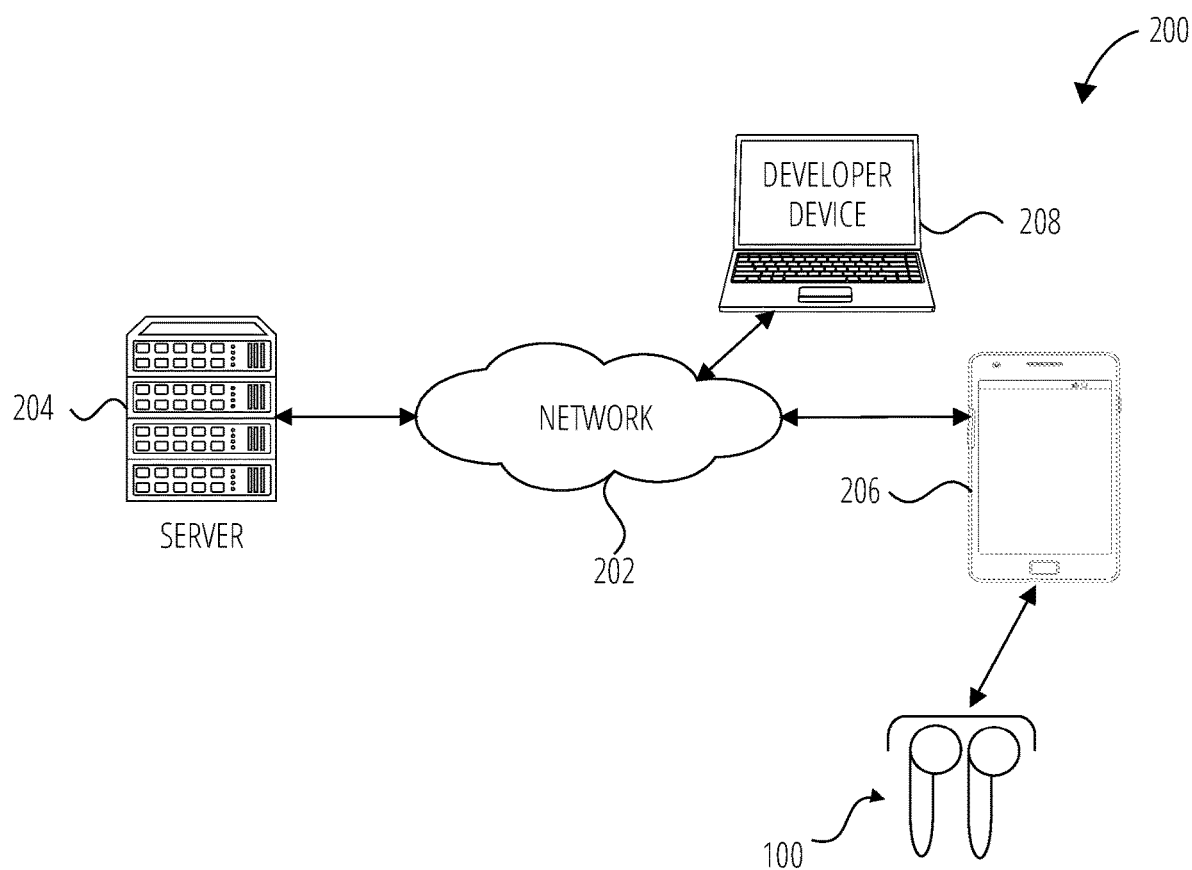
FIG. 2 illustrates a system in which a server, a client device and a developer device are connected to a network according to some examples.

FIG. 2 illustrates a system 200 in which a server 204, a client device 206 and a developer device 208 are connected to a network 202.

In various embodiments, the network 202 may include the Internet, a local area network ("LAN"), a wide area network ("WAN"), and/or other data network. In addition to traditional data-networking protocols, in some embodiments, data may be communicated according to protocols and/or standards including near field communication ("NFC"), Bluetooth, power-line communication ("PLC"), and the like. In some embodiments, the network 202 may also include a voice network that conveys not only voice communications, but also non-voice data such as Short Message Service ("SMS") messages, as well as data communicated via various cellular data communication protocols, and the like.

In various embodiments, the client device 206 may include desktop PCs, mobile phones, laptops, tablets, wearable computers, or other computing devices that are capable of connecting to the network 202 and communicating with the server 204, such as described herein. The client device 206 may be paired with wireless ear buds 100 (or other audio devices) that provide audio output to a user of the client device 206. Additionally, one or more developer devices 208 may be utilized to generate downloadable binary files that may be used to customize the audio of the wireless ear buds 100 as will be discussed in more detail below.

In various embodiments, additional infrastructure (e.g., short message service centers, cell sites, routers, gateways, firewalls, and the like), as well as additional devices may be present. Further, in some embodiments, the functions described as being provided by some or all of the server 204 and the client device 206 may be implemented via various combinations of physical and/or logical devices. However, it is not necessary to show such infrastructure and implementation details in FIG. 2 in order to describe an illustrative embodiment.

Figure 3:
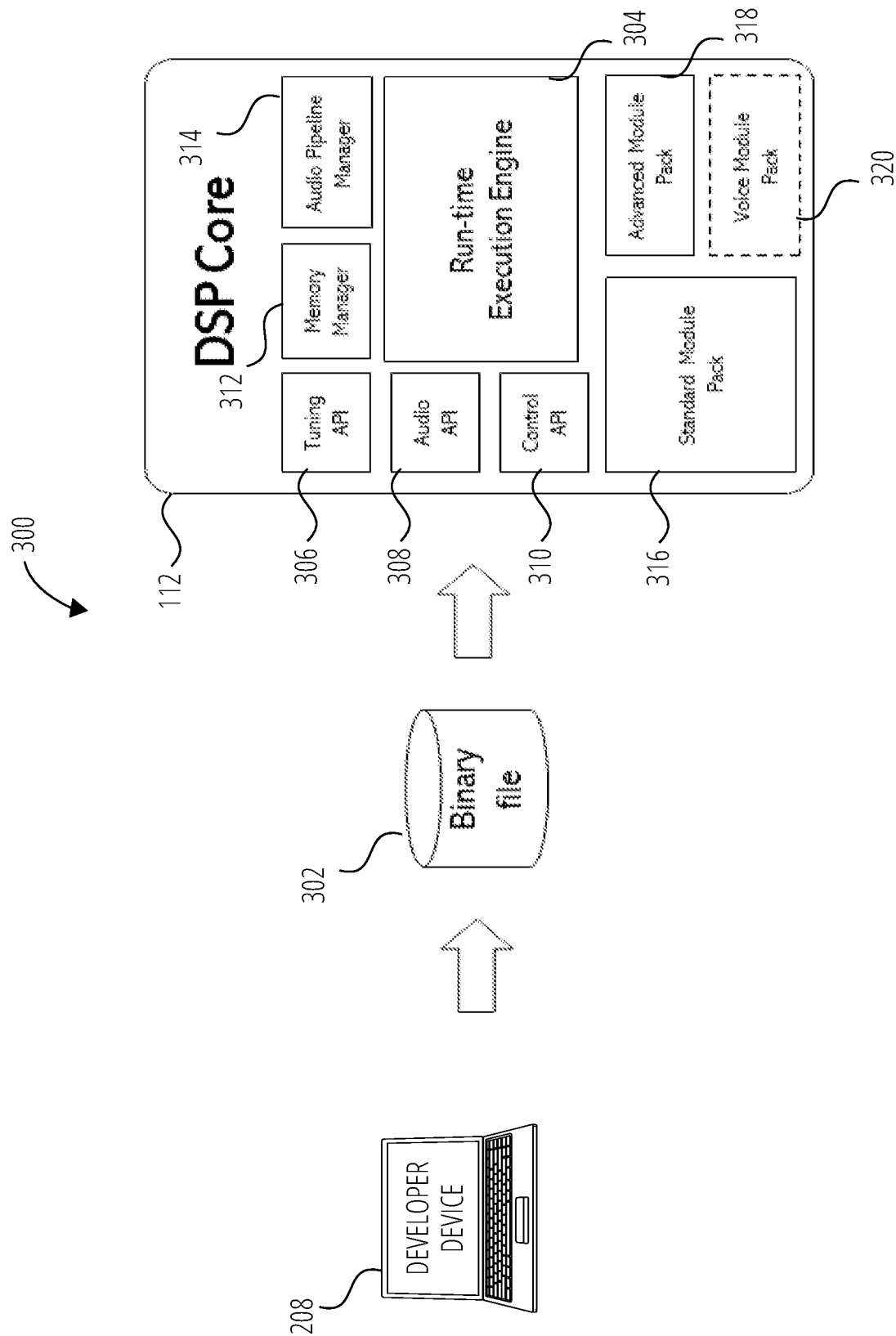
FIG. 3 illustrates a development and implementation flow diagram 300 according to some examples.

FIG. 3 illustrates a development and implementation flow diagram 300 according to some examples. Shown in the figure are a developer device 208, a binary file 302 and a DSP framework 112.

The developer device 208 hosts an application for use in developing downloadable custom audio features for the DSP framework 112. As user herein, the term custom includes both new audio features and updates to existing audio features. The application may for example be a windows-based graphical design environment that permits the definition of audio processing pathways by assembling and interconnecting various audio processing blocks and specifying associated parameters and interconnections. The final output of the application is the binary file 302.

The binary file 302 is a configuration file for the data-driven DSP framework 112 that specifies which audio modules in the DSP framework 112 to use (e.g., from standard module pack 316, advanced module pack 318 and/or voice module pack 320), how they are interconnected (via audio pipeline manager 314), and which parameter settings or values (not shown) are employed to provide custom audio processing. The binary file 302 can also impact the usage of input and control signals, such as the pressing of an existing button on the wireless ear buds 100, or a control signal from client device 206 or application 402, could be incorporated into the different audio processing functions as specified by the binary file 302. The binary file 302 can define processing that operates on incoming audio, outgoing audio, and can also define processing internally to the DSP framework 112 to generate or extract parameter values from the input, output or intermediate audio, which values can be used for audio or other system functions. In one example, the binary file is a netlist.

The binary file 302 is a platform independent data file that is stored in the DSP framework 112 and that configures the run-time execution engine 304 in the DSP framework 112. Since the binary file 302 defines audio processing that takes place within the DSP framework 112 and does not include executable code as such, it is not possible for a developer to include malicious executable code that can operate on non-audio information in the wireless ear buds or client device 206. Since the processing specified by the binary file 302 is limited to interconnections of and parameters for the audio modules in the DSP framework 112, privacy concerns are reduced when providing custom audio processing, since it is not possible for the DSP framework 112 to "reach out" and capture personally identifiable information such as biometric, financial or device positional information, or audio call data identifying called or calling parties.

Conventional audio customization on the other hand would either typically only permit the provision of custom "tuning" parameters that can adjust existing audio processing, or requires a firmware update for each audio device, in which and audio algorithms would have to be built specifically for each audio device and processor. An original hardware manufacturer would thus either have to curate audio features and embed them itself, or open up its firmware to third parties, allowing others to rebuild or update the firmware, which is unlikely to occur. Additionally, updates done using DLLs would require the recompilation and linking of any associated code.

The DSP framework 112 as embedded in the wireless ear buds 100 or (other audio product) will include core audio processing defined by the manufacturer of the wireless ear buds 100. The DSP framework 112 also provides a "toolbox" of audio processing modules that can be interconnected by a binary file 302 to provide additional or alternative processing to the core audio processing provided by the manufacturer. Third party or other application developers can, at the users discretion, augment or scale the audio processing of released products using custom binary files 302 provided as disclosed herein. The binary files 302 permit the dynamic updating of the audio signal chain completely separately from the operating system of the audio device or applications on the audio device, and without updating or relinking any executable code.

The DSP framework 112 is an embedded audio processing engine that includes optimized target-specific libraries for various audio processing applications. The DSP framework 112 is available for multiple processors and supports multicore and multi-instance implementations. In some examples, the DSP framework 112 includes a run-time execution engine 304 that can be controlled by multiple API's such as a tuning API 306, an audio API 308, and a control API 310. The 112 also includes a memory manager 312 and an audio pipeline manager 314. The DSP framework 112 also includes various audio processing module packs, such as a standard module pack 316, advanced module pack 318 and a voice module pack 320. As indicated by the dashed outline for the voice module pack 320, the exact number and types of different packs will depend on the particular implementation.

Figure 4:
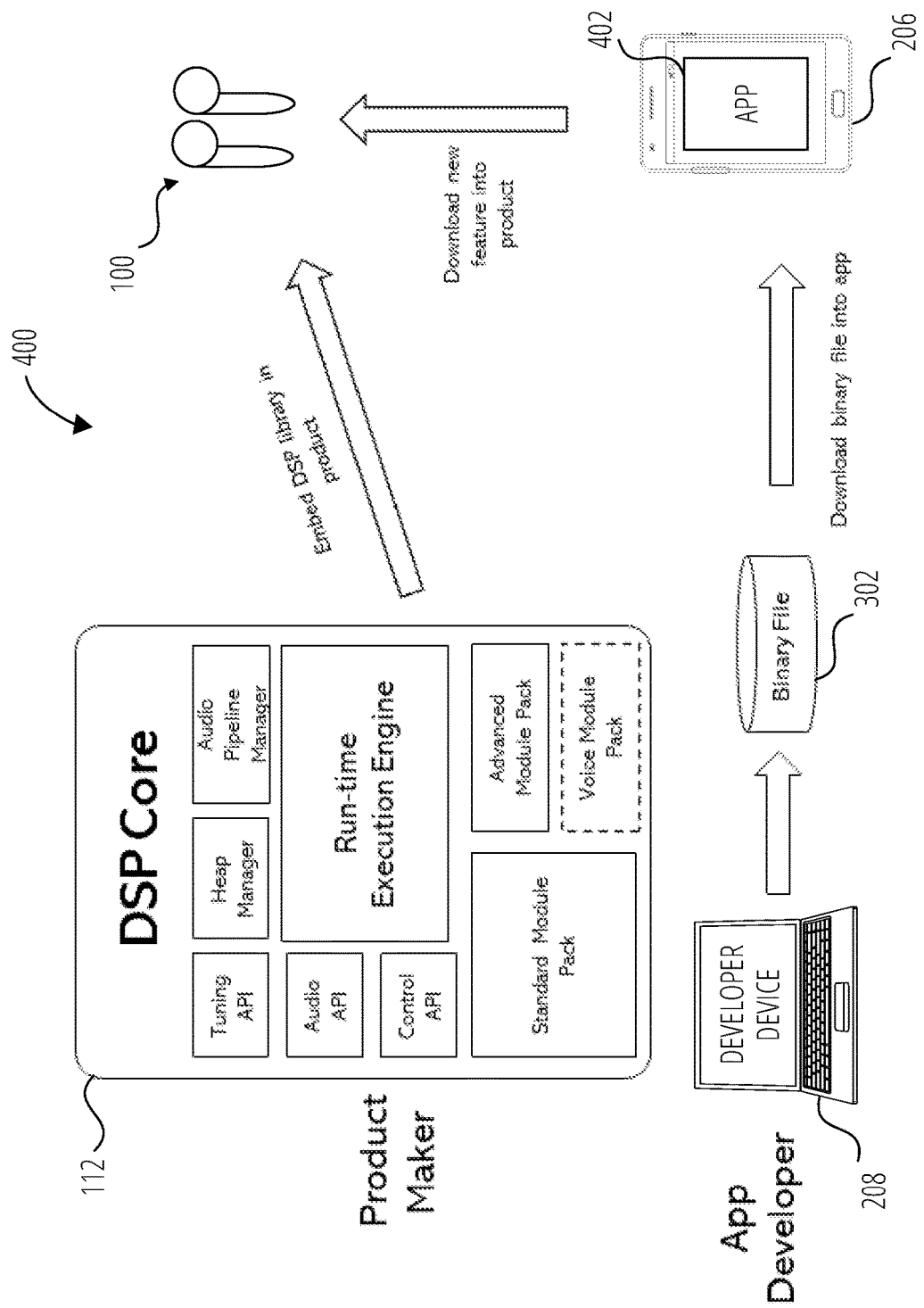
FIG. 4 illustrates a development and implementation flow diagram 400 according to some examples.

FIG. 4 illustrates a development and implementation flow diagram 400 according to some examples. Shown in the figure are wireless ear buds 100, a developer device 208, a binary file 302, a DSP framework 112 and a client device 206 hosting an application 402.

As illustrated, the developer of an audio device (for example the wireless ear buds 100) embeds the DSP framework 112 in the audio device prior to release. The DSP framework 112 will include appropriate modules for the particular audio device, including the standard module pack 316, the advanced module pack 318 and optionally, additional module packs such as the voice module pack 320.

As discussed above, the developer device 208 hosts an application for use in developing downloadable custom audio features for the DSP framework 112. The developer device 208 is used by an application developer that has or is developing the application 402, which can access or control the wireless ear buds 100. In some examples, the application 402 may be an audio app such as a music or video player or an integrated virtual assistant. In other examples, the developer of the wireless ear buds 100 may have an application 402 that a user of the client device 206 can use to access or manage the wireless ear buds 100, in which case the developer of the audio device and the developer of the application 402 may be one and the same. In such a case, third parties may be permitted to provide custom audio processing to the wireless ear buds 100 via an application 402 provided by the manufacturer of the wireless earbuds. Similarly, the custom audio processing may be defined by an independent audio processing developer or vendor to improve the audio processing of the wireless ear buds 100 when the earbuds are used with the application 402 itself.

That is, the manufacturer of the wireless ear buds 100 may be one party, the provider of the application may be a different (third) party, and the developer of the custom audio processing may again be a different (third) party. So in one example, the wireless ear buds 100 are sold by their manufacturer, the application 402 is a video streaming application provided by a streaming service provider, and the developer is a custom audio developer who creates a binary file 302 that provides custom audio processing for the wireless ear buds 100 when a user is watching video that is streamed using the application 402.

The developer device 208 is used by the app developer or third-party audio processing developer to create a binary file 302 to provide custom audio processing to the wireless ear buds 100. As mentioned above, the binary file 302 is a configuration file for the data-driven DSP framework 112 that tells the embedded target which audio modules in the DSP framework 112 to use, how they are interconnected, and which parameter settings to employ. The binary file 302 can for example provide more sophisticated or different audio processing than what was in the original DSP framework 112 when it was embedded in the wireless ear buds 100 originally. The binary file 302 can also impact the usage of input and control signals, such as the pressing of an existing button on the wireless ear buds 100, or a control signal from client device 206 or application 402, could be incorporated into the different audio processing functions as specified by the binary file 302. The binary file 302 is uploaded from the developer device 208 to a server 204 that is accessible to the client device 206.

The binary file 302 is then downloaded into the application 402 on the client device 206. This can be done directly over the network 202 from a server 204 operated by the app developer or the binary file 302 can be uploaded to an app store, where it can be downloaded by the user of the client device 206 in response to prompts in the application 402 or when updating the application 402 when prompted to do so by the OS on the client device 206.

Figure 5:
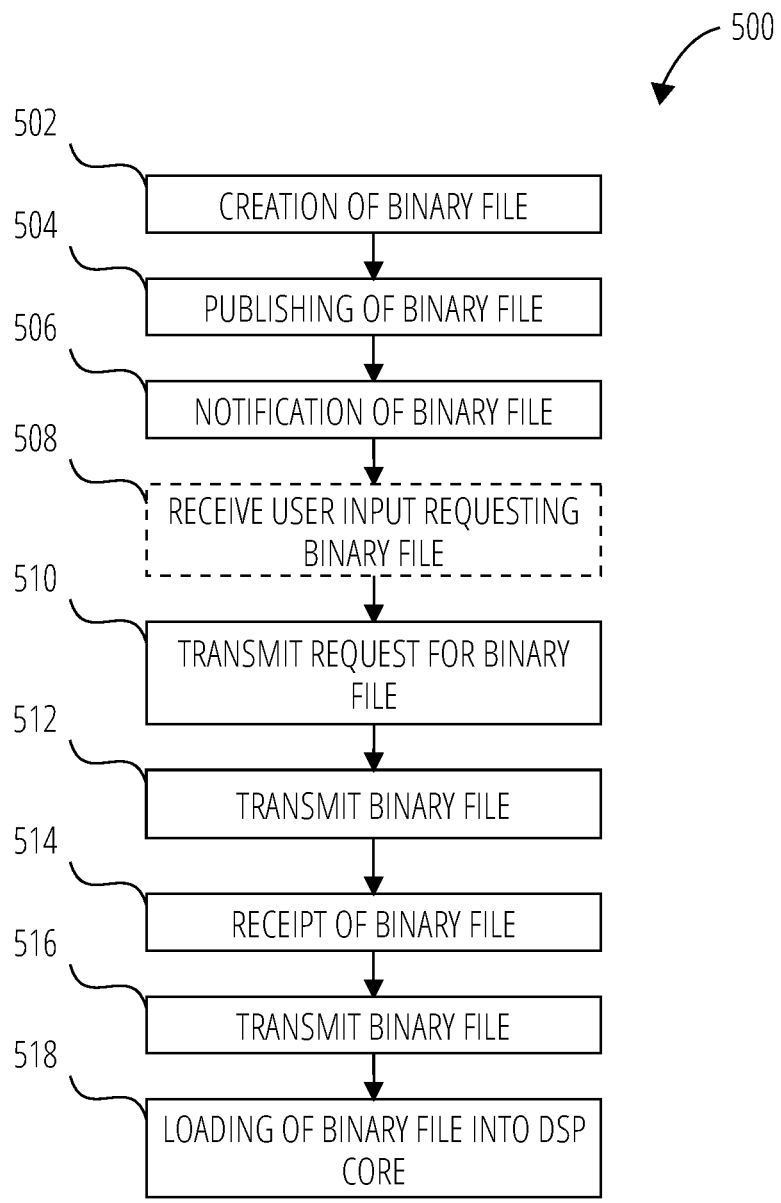
FIG. 5 illustrates a flowchart for providing customized audio processing according to some examples.

FIG. 5 illustrates a flowchart 500 for providing customized audio processing according to some examples. The flowchart 500 commences at operation 502 with creation of the binary file 302 by a developer of customized audio processing. This is done for example on a developer device 208 that hosts an application for use in developing downloadable custom audio features for the DSP framework 112. The application may for example be a windows-based graphical design environment that permits the definition of audio processing pathways by assembling and interconnecting various audio processing blocks and specifying associated parameters and interconnections.

The binary file 302 is then made available to the application 402 at operation 504. This can be done by uploading the binary file 302 from the developer device 208 to a server 204 that is accessible to the client device 206. For example, the binary file 302 can be uploaded to an app store, where it can be downloaded by the user of the client device 206 in response to prompts in the application 402 or when updating the application 402 if prompted to do so by the OS of the client device 206.

At operation 506, the application 402 or client device 206 is notified of the availability of the binary file 302. Depending on the settings on or implementation of the application 402 or client device 206, downloading of the binary file 302 may require that a notification and acceptance of the binary file be indicated by a user of the client device 206. Such a notification or prompt informs the user of the availability of custom audio processing for the wireless ear buds 100 (or other audio device) and prompts the user to select an option to download the binary file 302.

In response to receiving user input (if required) to download the binary file 302 in operation 508 (that is, to update the wireless ear buds 100 with custom audio processing or to update the application 402 itself), the application 402 or client device 206 transmits a request to the server to receive the binary file 302 in operation 510. In response, the server 204 transmits the binary file 302 to the client device 206 in operation 512. The binary file 302 is received by the client device 206 and application 402 in operation 514, over network 202 from server 204.

Alternatively, in the event that automatic updates are permitted or have been authorized for the application 402 or client device 206 or wireless ear buds 100, in response to receiving a corresponding instruction from the client device 206, the server 204 transmits the binary file 302 to the client device 206 in operation 512. An auto-update setting in the application 402 or on the client device 206 can be checked to determine whether or not automatic updates are permitted.

The binary file 302 is received by the client device 206 and application 402 in operation 514, over network 202 from server 204. The binary file 302 may also be provided as an update to the application 402.

The binary file 302 is then transmitted to the audio device in (such as the wireless ear buds 100) from the client device 206 by the application 402 in operation 516, typically over a wireless data link such as Bluetooth. The binary file 302 is then loaded into the DSP framework 112 by the audio device in operation 518. Customized audio processing can then be provided by the audio device according to contents of the binary file 302, which specifies which audio modules in the DSP framework 112 to use, how they are interconnected, and which parameter settings to employ to provide the custom audio processing. Selection of audio processing options and parameters can be done from the application 402 via the APIs provided by the DSP framework 112.

Figure 6:
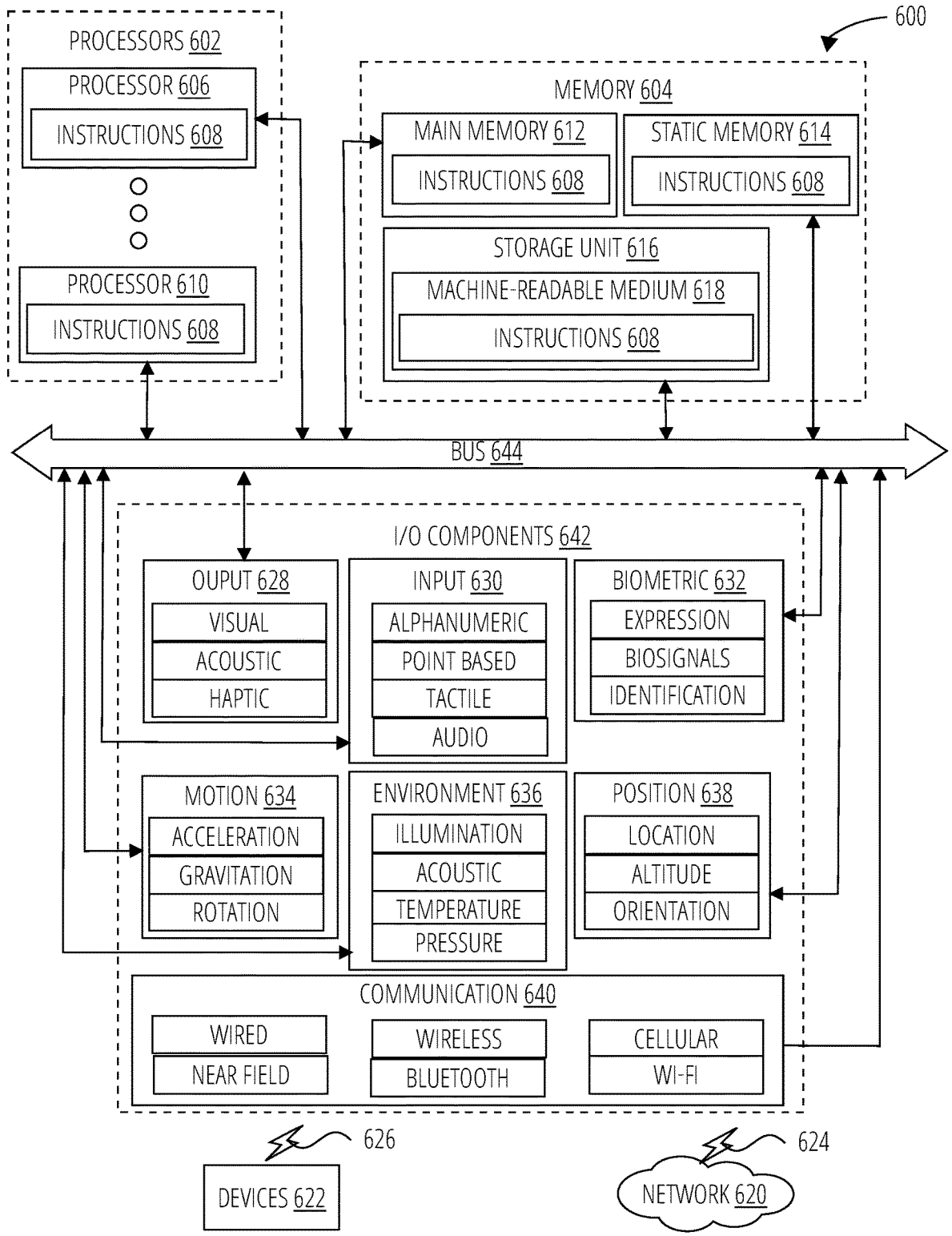
FIG. 6 illustrates a diagrammatic representation of a machine in the form of a computer system within which a set of instructions may be executed for causing the machine to perform any one or more of the methodologies discussed herein, according to an example.

FIG. 6 illustrates a diagrammatic representation of a machine 600 in the form of a computer system within which a set of instructions may be executed for causing the machine to perform any one or more of the methodologies discussed herein, according to an example embodiment. Specifically, FIG. 6 shows a diagrammatic representation of the machine 600 in the example form of a computer system, within which instructions 608 (e.g., software, a program, an application, an applet, an app, or other executable code) for causing the machine 600 to perform any one or more of the methodologies discussed herein may be executed. For example the instructions 608 may cause the machine 600 to execute the methods described above. The instructions 608 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 608, sequentially or otherwise, that specify actions to be taken by the machine 600. Further, while only a single machine 600 is illustrated, the term "machine" shall also be taken to include a collection of machines 600 that individually or jointly execute the instructions 608 to perform any one or more of the methodologies discussed herein.

The machine 600 may include processors 602, memory 604, and I/O components 642, which may be configured to communicate with each other such as via a bus 644. In an example embodiment, the processors 602 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 606 and a processor 610 that may execute the instructions 608. The term "processor" is intended to include multi-core processors that may comprise two or more independent processors (sometimes referred to as "cores") that may execute instructions contemporaneously. Although FIG. 6 shows multiple processors 602, the machine 600 may include a single processor with a single core, a single processor with multiple cores (e.g., a multi-core processor), multiple processors with a single core, multiple processors with multiples cores, or any combination thereof.

The memory 604 may include a main memory 612, a static memory 614, and a storage unit 616, both accessible to the processors 602 such as via the bus 644. The main memory 604, the static memory 614, and storage unit 616 store the instructions 608 embodying any one or more of the methodologies or functions described herein. The instructions 608 may also reside, completely or partially, within the main memory 612, within the static memory 614, within machine-readable medium 618 within the storage unit 616, within at least one of the processors 602 (e.g., within the processor's cache memory), or any suitable combination thereof, during execution thereof by the machine 600.

The I/O components 642 may include a wide variety of components to receive input, provide output, produce output, transmit information, exchange information, capture measurements, and so on. The specific I/O components 642 that are included in a particular machine will depend on the type of machine. For example, portable machines such as mobile phones will likely include a touch input device or other such input mechanisms, while a headless server machine will likely not include such a touch input device. It will be appreciated that the I/O components 642 may include many other components that are not shown in FIG. 6. The I/O components 642 are grouped according to functionality merely for simplifying the following discussion and the grouping is in no way limiting. In various example embodiments, the I/O components 642 may include output components 628 and input components 630. The output components 628 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 630 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 642 may include biometric components 632, motion components 634, environmental components 636, or position components 638, among a wide array of other components. For example, the biometric components 632 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 634 may include acceleration sensor components (e.g., accelerometer), gravitation sensor components, rotation sensor components (e.g., gyroscope), and so forth. The environmental components 636 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 638 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 642 may include communication components 640 operable to couple the machine 600 to a network 620 or devices 622 via a coupling 624 and a coupling 626, respectively. For example, the communication components 640 may include a network interface component or another suitable device to interface with the network 620. In further examples, the communication components 640 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 622 may be another machine or any of a wide variety of peripheral devices (e.g., a peripheral device coupled via a USB).

Moreover, the communication components 640 may detect identifiers or include components operable to detect identifiers. For example, the communication components 640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 640, such as location via Internet Protocol (IP) geolocation, location via Wi-Fi® signal triangulation, location via detecting an NFC beacon signal that may indicate a particular location, and so forth.

The various memories (i.e., memory 604, main memory 612, static memory 614, and/or memory of the processors 602) and/or storage unit 616 may store one or more sets of instructions and data structures (e.g., software) embodying or utilized by any one or more of the methodologies or functions described herein. These instructions (e.g., the instructions 608), when executed by processors 602, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of non-transitory machine-readable media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 620 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 620 or a portion of the network 620 may include a wireless or cellular network, and the coupling 624 may be a Code Division Multiple Access (CDMA) connection, a Global System for Mobile communications (GSM) connection, or another type of cellular or wireless coupling. In this example, the coupling 624 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 608 may be transmitted or received over the network 620 using a transmission medium via a network interface device (e.g., a network interface component included in the communication components 640) and utilizing any one of a number of well-known t transfer protocols (e.g., hypertext transfer protocol (HTTP)). Similarly, the instructions 608 may be transmitted or received using a transmission medium via the coupling 626 (e.g., a peer-to-peer coupling) to the devices 622. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 608 for execution by the machine 600, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A method of providing custom audio processing in an audio device, comprising:
    transmitting a request for an audio processing configuration file from an application running on a personal computing device, the application being associated with the audio device;
    receiving the audio processing configuration file at the personal computing device, the audio processing configuration file defining a custom audio signal path by identifying audio modules, interconnections between the audio modules and related settings for custom audio processing;
    transmitting the audio processing configuration file to the audio device from the personal computing device; and
    loading the audio processing configuration file into the audio device.

2. The method of claim 1, wherein the audio device includes an audio DSP processing framework including a run-time execution engine and run-time libraries, and the audio processing configuration file is a binary file that configures specific run-time libraries to provide customized audio processing.

3. The method of claim 2, wherein the audio processing configuration file is loaded into the audio device without requiring updating or recompiling of executable code.

4. The method of claim 1, wherein the audio processing configuration file has been created by an independent third-party developer and not a manufacturer of the device.

5. The method of claim 1, further comprising:
    providing a user notification of availability of an audio processing configuration file; and
    receiving user input via the application on the personal computing device to load the audio processing configuration file into the audio device.

6. The method of claim 1, further comprising:
    receiving, at the application associated with the audio device, a notification of availability of an audio processing configuration file;
    accessing an auto-update setting for the application or the personal computing device; and
    transmitting the request for the audio processing configuration file from the personal computing device without user input, based on the auto-update setting being positive.

7. The method of claim 5, wherein the audio processing configuration file is loaded into the audio device without requiring updating or recompiling of executable code.

8. A non-transitory computer-readable storage medium, the computer-readable storage medium including instructions that when executed by a computer, cause the computer to perform operations for providing custom audio processing in an audio device, the operations comprising:
    transmitting a request for an audio processing configuration file from an application running on a personal computing device, the application being associated with the audio device;
    receiving the audio processing configuration file at the personal computing device, the audio processing configuration file defining a custom audio signal path by identifying audio modules, interconnections between the audio modules and related settings for custom audio processing;
    transmitting the audio processing configuration file to the audio device from the personal computing device; and
    loading the audio processing configuration file into the audio device.

9. The computer-readable storage medium of claim 8, wherein the audio device includes an audio DSP processing framework including a run-time execution engine and run-time libraries, and the audio processing configuration file is a binary file that configures specific run-time libraries to provide customized audio processing.

10. The computer-readable storage medium of claim 9, wherein the audio processing configuration file is loaded into the audio device without requiring updating or recompiling of executable code.

11. The computer-readable storage medium of claim 8, wherein the audio processing configuration file has been created by an independent third-party developer and not a manufacturer of the device.

12. The computer-readable storage medium of claim 8, wherein the operations further comprise:
    providing a user notification of availability of an audio processing configuration file; and
    receiving user input via the application on the personal computing device to load the audio processing configuration file into the audio device.

13. The computer-readable storage medium of claim 8, wherein the instructions further configure the computer to perform operations comprising:
    receiving, at the application associated with the audio device, a notification of availability of an audio processing configuration file;
    accessing an auto-update setting for the application or the personal computing device; and
    transmitting the request for the audio processing configuration file from the personal computing device without user input, based on the auto-update setting being positive.

14. The computer-readable storage medium of claim 9, wherein the audio processing configuration file is loaded into the audio device without requiring updating or recompiling of executable code.

15. A computing apparatus comprising:
    a processor; and
    a memory storing instructions that, when executed by the processor, configure the apparatus to perform operations for providing custom audio processing in an audio device, the operations comprising:
    transmitting a request for an audio processing configuration file from an application running on a personal computing device, the application being associated with the audio device;

receiving the audio processing configuration file at the personal computing device, the audio processing configuration file defining a custom audio signal path by identifying audio modules, interconnections between the audio modules and related settings for custom audio processing;

transmitting the audio processing configuration file to the audio device from the personal computing device; and loading the audio processing configuration file into the audio device.

16. The computing apparatus of claim 15, wherein the audio device includes an audio DSP process framework including a run-time execution engine and run-time libraries, and the audio processing configuration file is a binary file that configures specific run-time libraries to provide customized audio processing.

17. The computing apparatus of claim 15, wherein the audio processing configuration file is loaded into the audio device without requiring updating or recompiling of executable code.

18. The computing apparatus of claim 15, wherein the audio processing configuration file has been created by an independent third-party developer and not a manufacturer of the device.

19. The computing apparatus of claim 15, wherein the operations further comprise:

receiving, at the application associated with the audio device, a notification of availability of an audio processing configuration file;

accessing an auto-update setting for the application or the personal computing device; and transmitting the request for the audio processing configuration file from the personal computing device without user input, based on the auto-update setting being positive.

20. The computing apparatus of claim 15, wherein the operations further comprise:

providing a user notification of availability of an audio processing configuration file; and receiving user input via the application on the personal computing device to load the audio processing configuration file into the audio device.

* * * * *